US012600243B1

(12) United States Patent　　　(10) Patent No.:　US 12,600,243 B1

Gibson　　　(45) Date of Patent:　Apr. 14, 2026

(54) ELECTRIC VEHICLE

(71) Applicant: Kenneth Gibson, Jonesboro, GA (US)

(72) Inventor: Kenneth Gibson, Jonesboro, GA (US)

( * ) Notice: Subject to any disclaimer, the term of this patent is extended or adjusted under 35 U.S.C. 154(b) by 667 days.

(21) Appl. No.: 18/084,979

(22) Filed: Dec. 20, 2022

(51) Int. Cl.
| | |
|---|---|
| *B60L 8/00* | (2006.01) |
| *B60L 50/16* | (2019.01) |
| *B60L 50/60* | (2019.01) |
| *B60L 53/51* | (2019.01) |
| *B60L 53/52* | (2019.01) |
| *H02J 7/14* | (2006.01) |
| *H02K 7/18* | (2006.01) |

(52) U.S. Cl.
CPC .................. *B60L 8/00* (2013.01); *B60L 8/003* (2013.01); *B60L 8/006* (2013.01); *B60L 50/16* (2019.02); *B60L 50/60* (2019.02); *B60L 53/51* (2019.02); *B60L 53/52* (2019.02); *H02J 7/1415* (2013.01); *H02K 7/183* (2013.01)

(58) Field of Classification Search
CPC ....................................................... B60L 8/00
USPC ......................................................... 320/101
See application file for complete search history.

(56) References Cited

U.S. PATENT DOCUMENTS

| | | | | | |
|---|---|---|---|---|---|
| 5,584,355 | A | * | 12/1996 | Burns ........................ | B60L 8/00 |
| | | | | | 290/55 |
| D390,501 | S | | 2/1998 | Kranz | |
| 5,986,429 | A | * | 11/1999 | Mula, Jr. ................. | F03D 13/20 |
| | | | | | 290/55 |

| | | | | | |
|---|---|---|---|---|---|
| 7,434,636 | B2 | * | 10/2008 | Sutherland .............. | F03D 13/10 |
| | | | | | 180/2.2 |
| 8,220,569 | B2 | | 7/2012 | Hassan | |
| 8,646,550 | B2 | * | 2/2014 | Penev ........................ | B60L 7/10 |
| | | | | | 180/2.2 |
| 8,860,357 | B1 | * | 10/2014 | Decady ..................... | F03D 9/11 |
| | | | | | 180/2.2 |
| 2002/0153178 | A1 | * | 10/2002 | Limonius ................ | B60L 8/003 |
| | | | | | 180/2.2 |
| 2008/0202825 | A1 | * | 8/2008 | Kerish .................... | B60L 8/003 |
| | | | | | 180/2.2 |
| 2010/0006351 | A1 | * | 1/2010 | Howard ................... | B60L 50/60 |
| | | | | | 180/2.2 |
| 2010/0051370 | A1 | * | 3/2010 | Li ............................ | B60L 8/003 |
| | | | | | 180/165 |
| 2011/0025256 | A1 | * | 2/2011 | Cunico ................... | B60L 8/003 |
| | | | | | 320/101 |
| 2011/0101698 | A1 | | 5/2011 | Saluccio | |
| 2011/0309786 | A1 | * | 12/2011 | Hassan ................. | F03D 3/0427 |
| | | | | | 290/55 |
| 2021/0129699 | A1 | * | 5/2021 | Luoma ...................... | H02J 7/14 |
| 2022/0281328 | A1 | * | 9/2022 | Lewis ..................... | B60L 8/003 |

FOREIGN PATENT DOCUMENTS

| | | |
|---|---|---|
| EP | 3815954 | 5/2021 |

* cited by examiner

*Primary Examiner* — Jerry D Robbins

(57)　　　　　ABSTRACT

The electric vehicle is a power regeneration system. The electric vehicle comprises an electric vehicle and a plurality of regeneration devices. The plurality of regeneration devices mount on the electric vehicle. The electric vehicle further comprises an electric motor and a motive battery. Each regeneration device selected from the plurality of regeneration devices converts an environmentally available energy source into electric energy. The generated electric energy is used to recharge the motive battery. The environmentally available energy source is selected from the group consisting of: a) solar energy; and, b) wind energy.

12 Claims, 8 Drawing Sheets

100

101

5

5

102

131

ELECTRIC VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric propulsion systems with power supplied from within the vehicle. (B60L50/16)

SUMMARY OF INVENTION

The electric vehicle is a power regeneration system. The electric vehicle comprises an electric vehicle and a plurality of regeneration devices. The plurality of regeneration devices mount on the electric vehicle. The electric vehicle further comprises an electric motor and a motive battery. Each regeneration device selected from the plurality of regeneration devices converts an environmentally available energy source into electric energy. The generated electric energy is used to recharge the motive battery. The environmentally available energy source is selected from the group consisting of: a) solar energy; and, b) wind energy.

These together with additional objects, features and advantages of the electric vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the electric vehicle in detail, it is to be understood that the electric vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electric vehicle.

It is therefore important that the claims be regarded as including such equivalent construction insofar as they do not depart from the spirit and scope of the electric vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
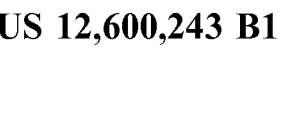
FIG. 1 is a side view of an embodiment of the disclosure.
Figure 3:
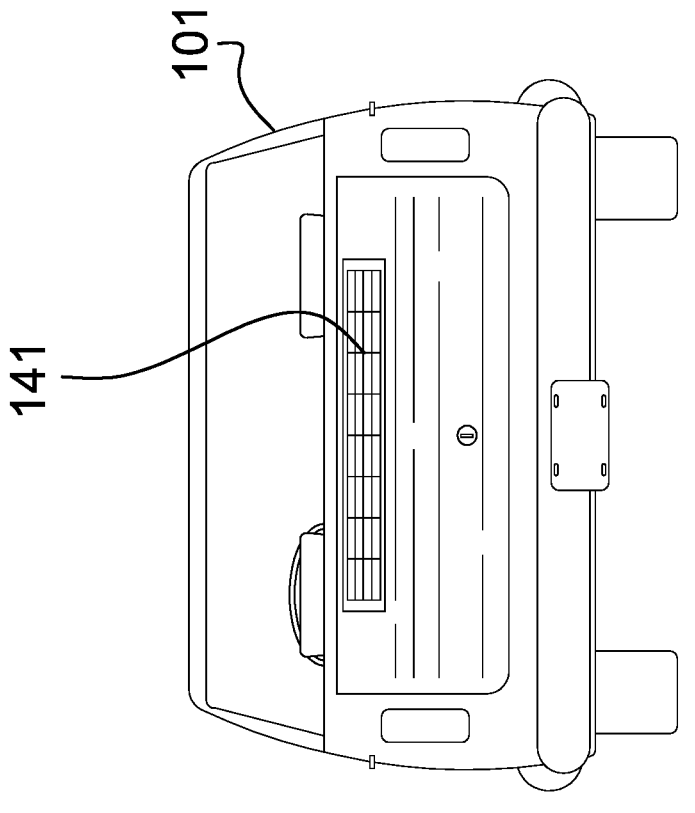
FIG. 3 is a posterior view of an embodiment of the disclosure.
Figure 2:
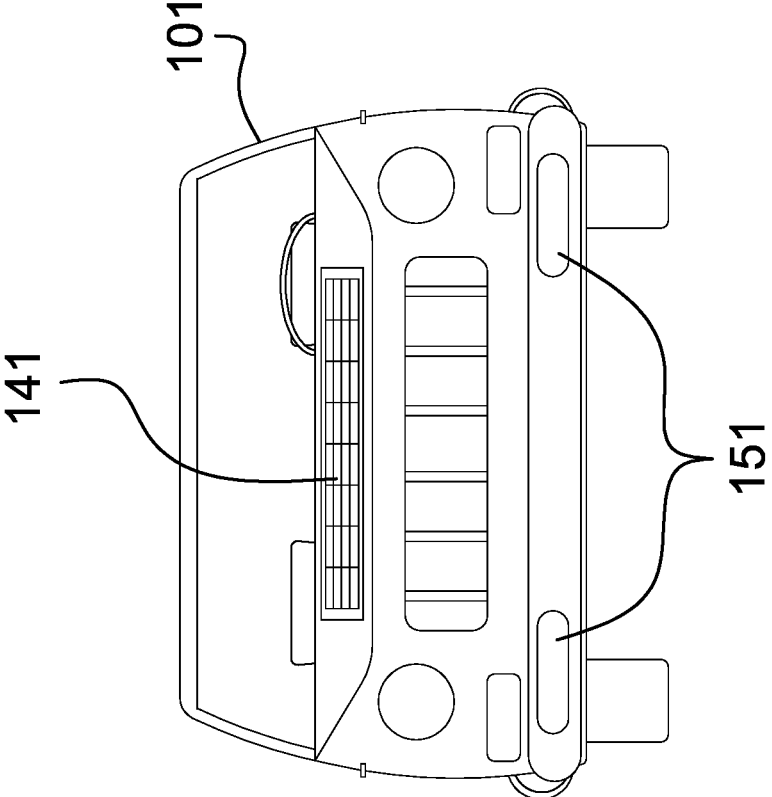
FIG. 2 is an anterior view of an embodiment of the disclosure.
Figure 4:
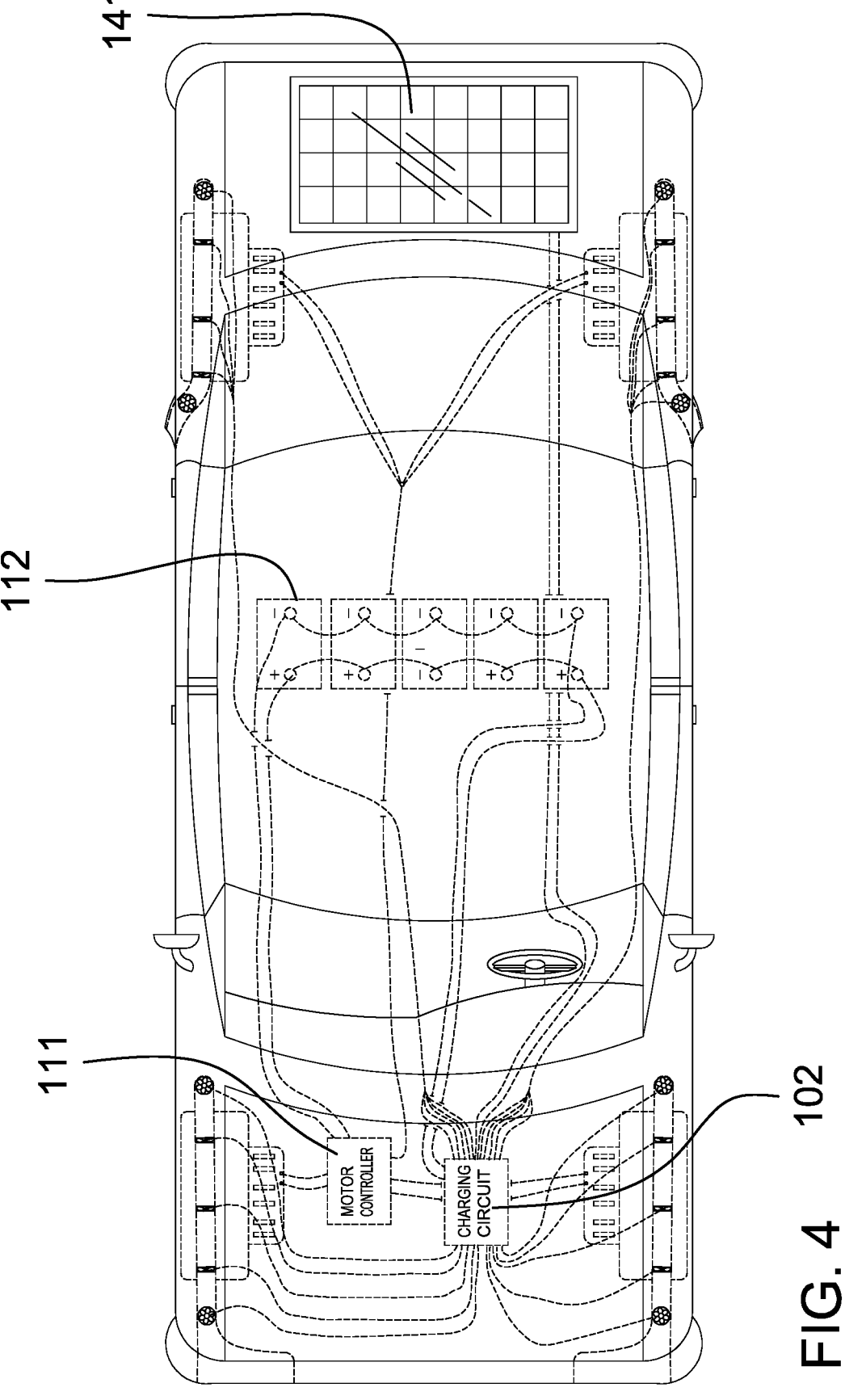
FIG. 4 is a top view of an embodiment of the disclosure.
Figure 5:
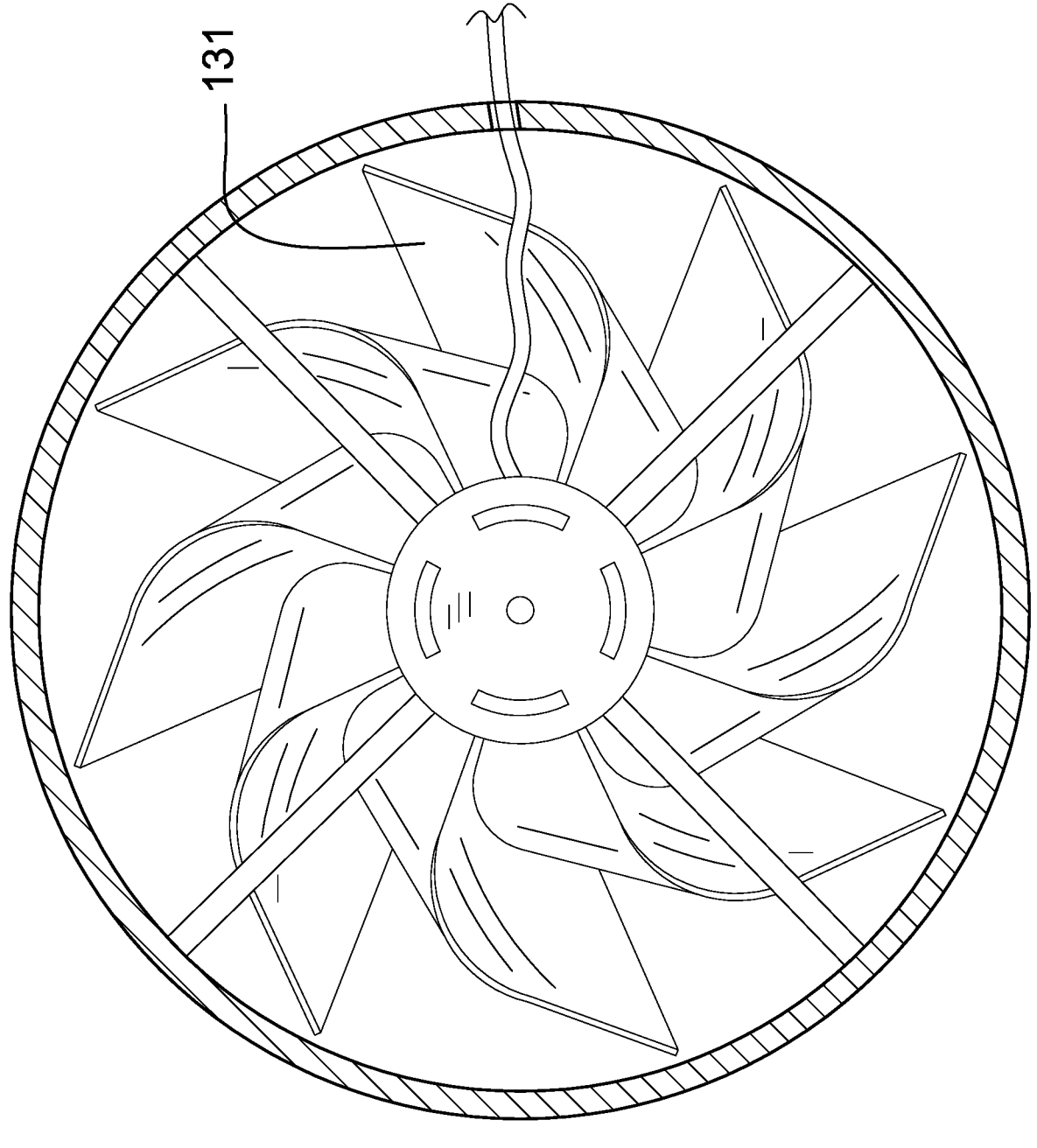
FIG. 5 is a cross-sectional view of an embodiment of the disclosure across 5-5 as shown in FIG. 1.
Figure 6:
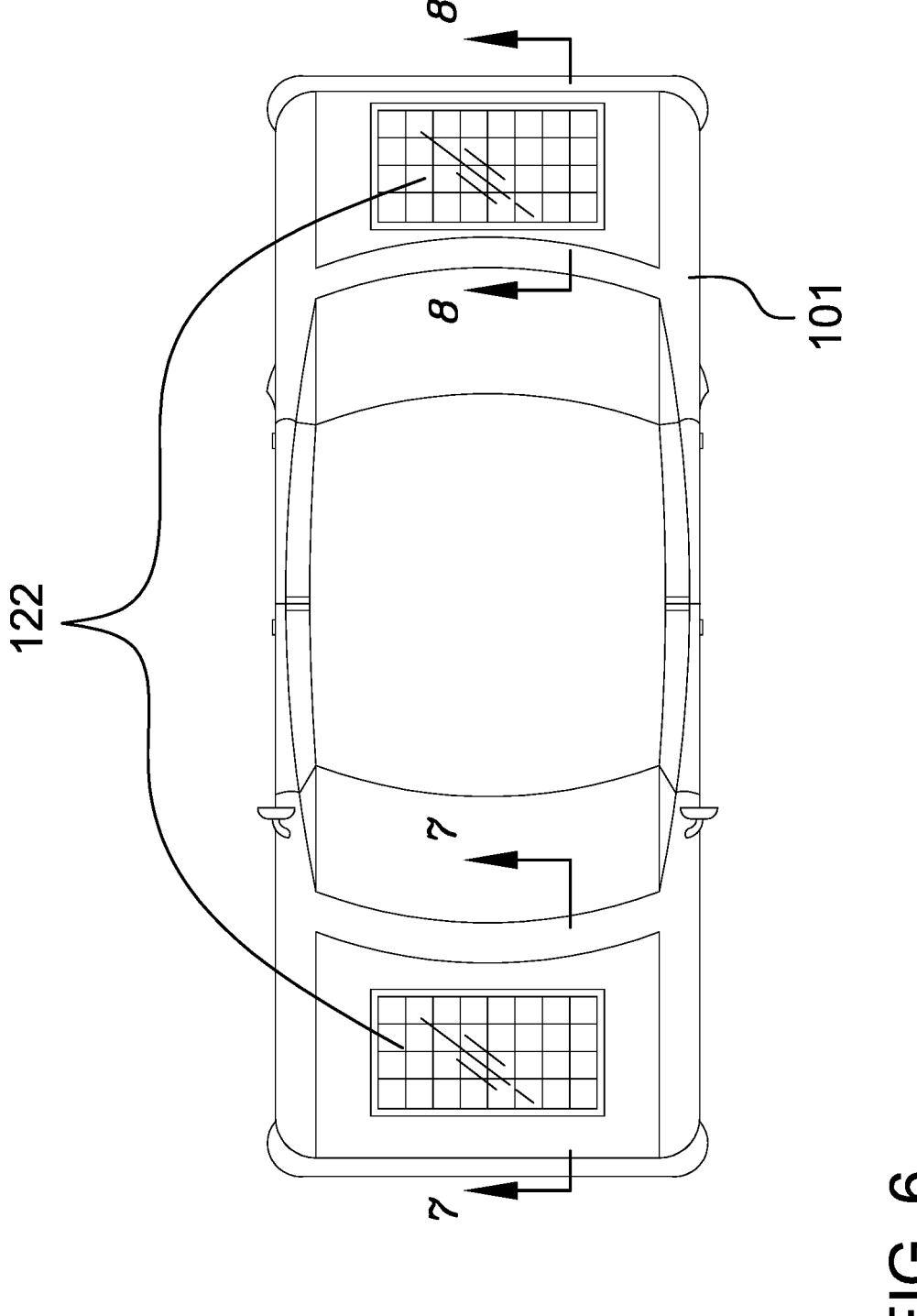
FIG. 6 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 9.

The electric vehicle 100 (hereinafter invention) is an energy regeneration system. The invention 100 comprises an electric vehicle 101 and a plurality of regeneration devices 102. The plurality of regeneration devices 102 mount on the electric vehicle 101. The electric vehicle 101 further comprises an electric motor and a motive battery. Each regeneration device selected from the plurality of regeneration devices 102 converts an environmentally available energy source into electric energy. The generated electric energy is used to recharge the motive battery. The environmentally available energy source is selected from the group consisting of: a) solar energy; and, b) wind energy.

The electric vehicle 101 is a motorized vehicle. The electric vehicle 101 is an electrically powered vehicle. The form of the electric vehicle 101 is selected from the group consisting of an electrically powered vehicle and a hybrid vehicle. The electric vehicle 101 is defined elsewhere in this disclosure. The electric vehicle 101 comprises an electric motor 111 and a motive battery 112.

The electric motor 111 is an electromechanical device. The electric motor 111 converts electric energy into rotational energy. The electric motor 111 provides the electric vehicle 101 with the motive forces necessary to move the electric vehicle 101.

The motive battery 112 is an electrochemical device. The motive battery 112 stores chemical potential energy. The motive battery 112 converts the chemical potential energy into electric energy. The motive battery 112 electrically connects to the electric motor 111. The electric energy generated by the motive battery 112 is transmitted to the electric motor 111. The motive battery 112 electrically connects to each regeneration device selected from the plurality of regeneration devices. Each selected regeneration device electrically connects to the motive battery 112 such that each selected regeneration device reverses the polarity of the motive battery 112. The electric energy received by the motive battery 112 from the selected regeneration device provides the energy necessary to reverse the chemical processes that the motive battery 112 initially used to generate electric energy. This reversal of the chemical process creates a chemical potential energy that will later be used by the motive battery 112 to generate electric energy.

The plurality of regeneration devices 102 comprises a collection of regeneration devices. Each regeneration device selected from the plurality of regeneration devices is an electric device. Each selected regeneration device electrically connects to the motive battery 112 of the electric vehicle 101. Each selected regeneration device converts an environmentally available energy source into electric energy. The energy generated by each selected regeneration device is used to recharge the motive battery 112. Each regeneration device selected from the plurality of regeneration devices mounts on the electric vehicle 101. Each selected regeneration device mounts on the electric vehicle 101 such that the selected regeneration device has access to the environmentally available energy source.

The plurality of regeneration devices 102 comprises a turbine 131 regeneration device 121, a photoelectric regeneration device 122, and a zener diode.

The turbine 131 regeneration device 121 is an electromechanical device. The turbine 131 regeneration device 121 captures atmospheric gases as the electric vehicle 101 moves through the air. The turbine 131 regeneration device 121 captures the atmospheric gases under pressure such that the captured atmospheric gases move through the turbine 131 regeneration device 121. The turbine 131 regeneration device 121 converts the momentum of the moving mass of the atmospheric gases into electric energy. The turbine 131 regeneration device electrically connects to the motive battery 112. The electric energy that is generated by the turbine 131 regeneration device 121 is transferred to the motive battery 112. The turbine 131 regeneration device 121 comprises a turbine 131, an electric generator 132, and a generator isolation diode 133.

The turbine 131 is a mechanical device. The turbine 131 converts the flow of atmospheric gases through the turbine 131 regeneration device 121 into rotational energy. The turbine 131 mechanically links to the electric generator 132. The turbine 131 transfers the generated rotation energy to the electric generator 132 through the mechanical linkage. The turbine 131 further comprises an air intake port structure 151, a flow manifold structure 152, and an air discharge port structure 153.

The air intake port structure 151 is a fluid port. The air intake port structure 151 receives the atmospheric gases from the air. The air intake port structure 151 comprises a collection of ports that collect air from: a) the front bumper of the electric vehicle 101; and, b) each of one or more wheel wells of the electric vehicle 101. The air intake port structure 151 transports the captured atmospheric gases to the flow manifold structure 152.

The flow manifold structure 152 is a manifold. The flow manifold structure 152 receives the atmospheric gas flow from each fluid port of the air intake port structure 151. The flow manifold structure 152 merges the multiple received flows of atmospheric gases into a single flow of atmospheric gas. The flow manifold structure 152 transports the merged atmospheric gases to the turbine 131 for conversion into rotational energy.

The air discharge port structure 153 receives the flow of atmospheric gases that are discharged from the turbine 131. The air discharge port structure 153 discharges the flow of atmospheric gases from the turbine 131 regeneration device 121.

The electric generator 132 is an electromechanical device. The electric generator 132 converts the rotational energy received from the turbine 131 into electric energy. The electric generator 132 electrically connects to the motive battery 112. The electric energy that is generated by the electric generator 132 is transferred to the motive battery 112.

The generator isolation diode 133 is a diode. The generator isolation diode 133 inserts into the electrical connection between the electric generator 132 and the motive battery 112. The generator isolation diode 133 isolates the electric generator 132 from the motive battery 112. By isolate is meant that the generator isolation diode 133 prevents electric energy from flowing from the motive battery 112 into the electric generator 132.

The photoelectric regeneration device 122 is a photoelectric device. The photoelectric regeneration device 122 mounts on the electric vehicle 101 such that the sun is within the field of view of the photoelectric regeneration device 122. The photoelectric regeneration device 122 captures electromagnetic radiation from the sun. The photoelectric regeneration device 122 converts the captured electromagnetic radiation into electric energy. The photoelectric regeneration device 122 electrically connects to the motive battery 112. The electric energy that is generated by the photoelectric regeneration device 122 is transferred to the motive battery 112. The photoelectric regeneration device 122 comprises a photovoltaic cell 141 and a cell isolation diode 142.

Figure 7:
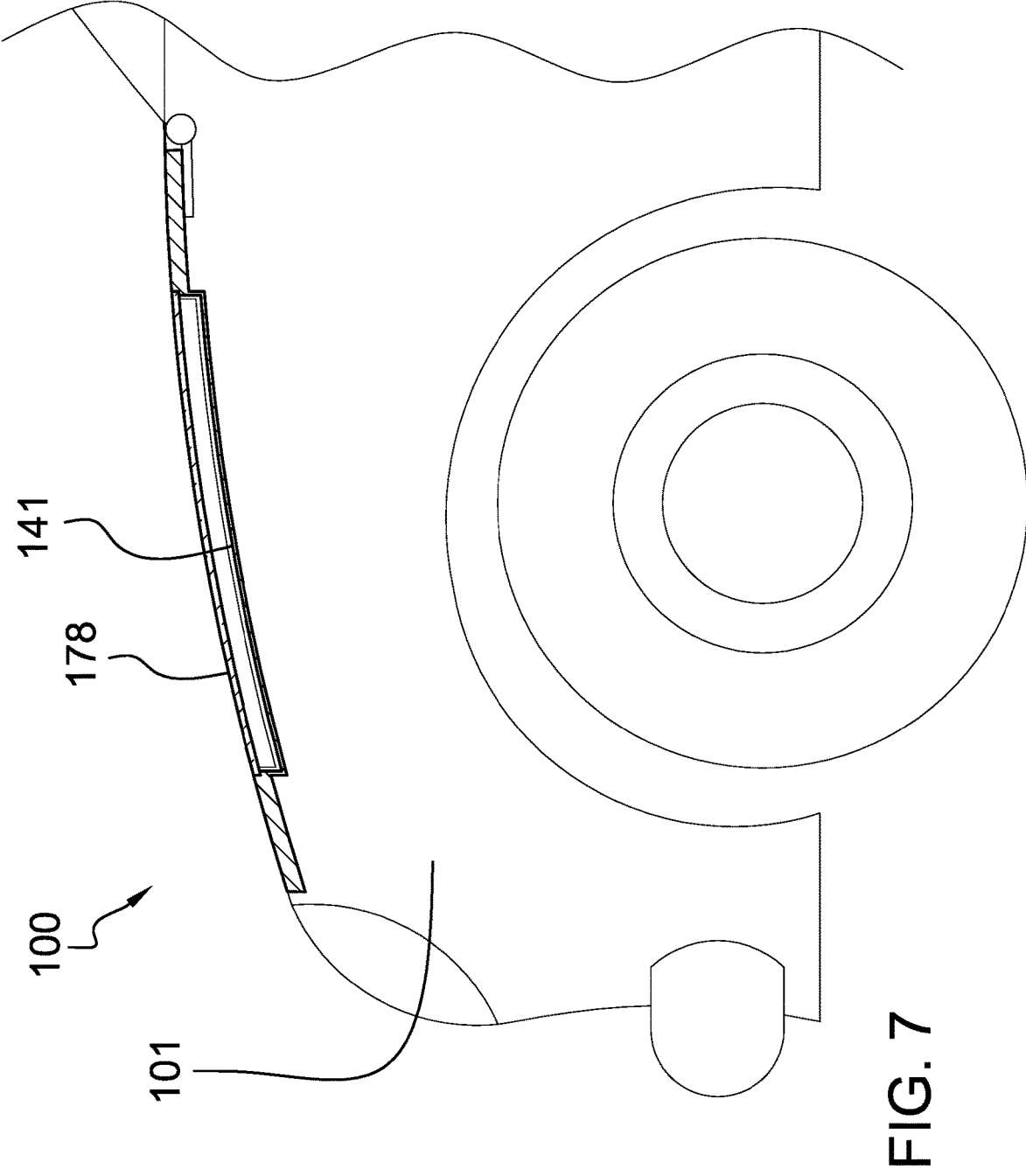
FIG. 7 is a cross-sectional view of an embodiment of the disclosure.
Figure 8:
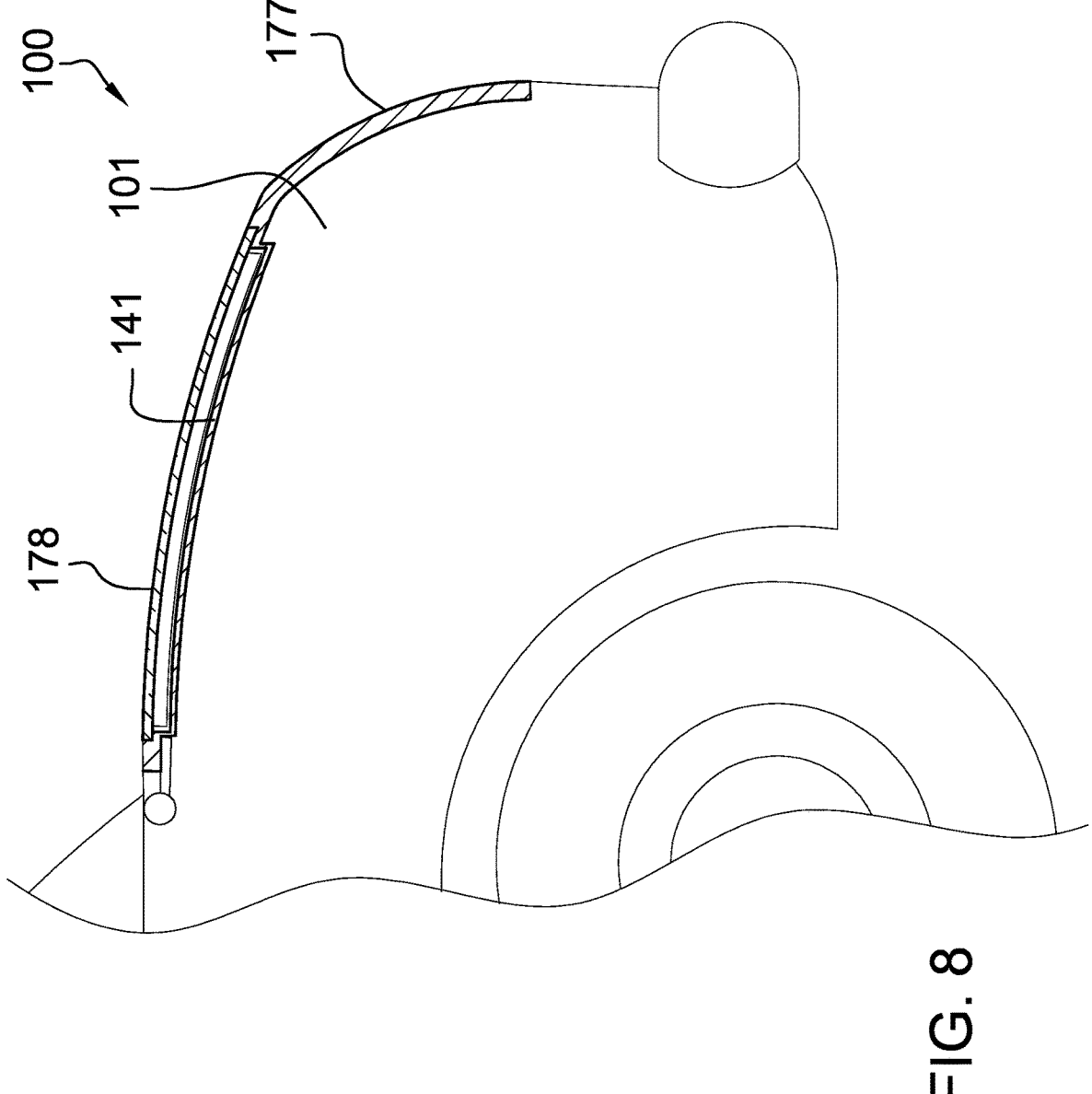
FIG. 8 is a cross-sectional view of an embodiment of the disclosure.
Figure 9:
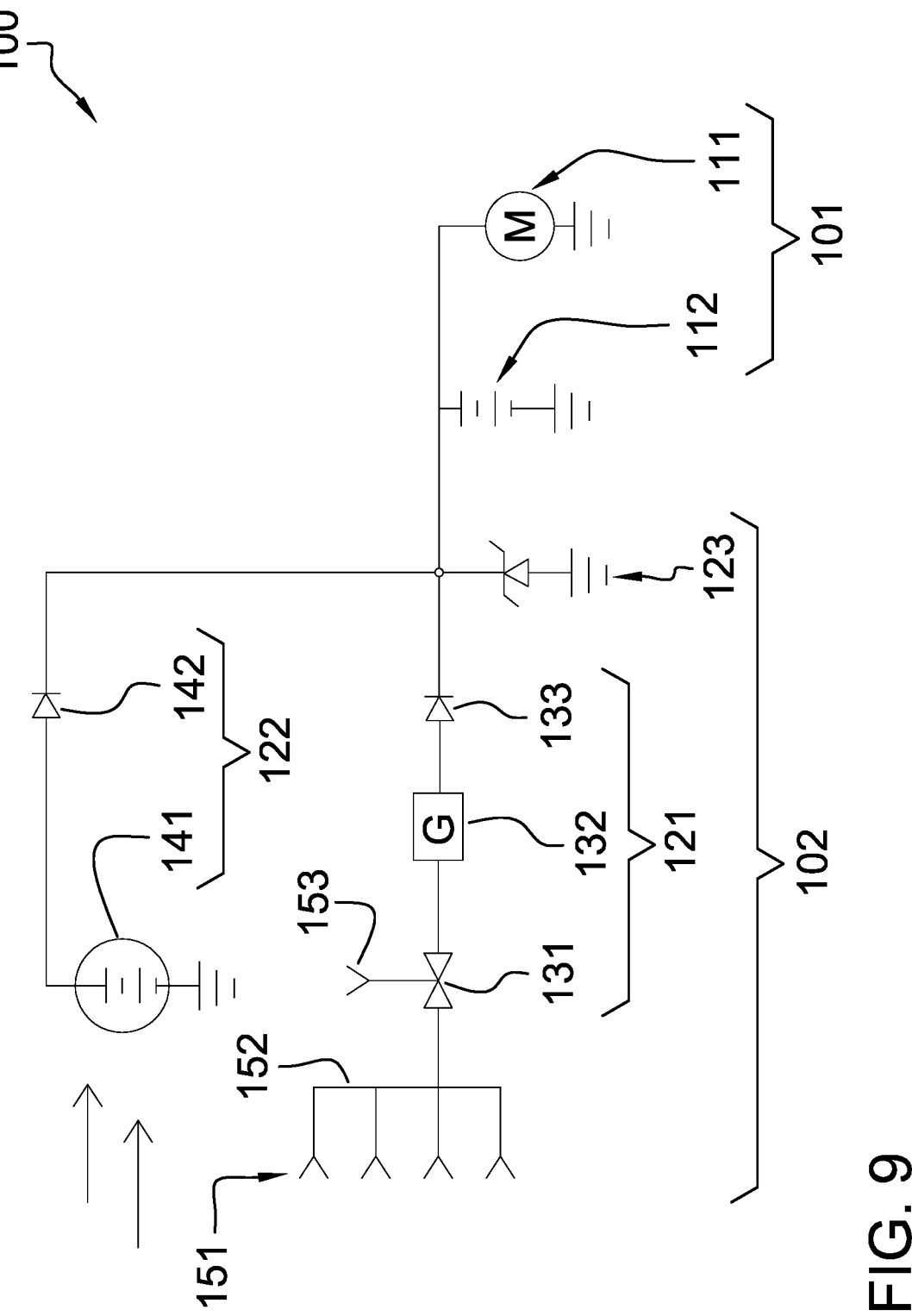
FIG. 9 is a schematic view of an embodiment of the disclosure.

Referring to FIGS. 7 and 8, the photovoltaic cell 141 may be positioned beneath a superior surface 177 of the electric vehicle 101. Moreover, a protective cover 178 is provided and placed over the photovoltaic cell 141. The protective cover 178 is flush with the superior surface 177 of the electric vehicle 101. The protective cover 178 may be made of a translucent material, and may be further made of a Plexiglass. The purpose of the protective cover 178 is to protect the photovoltaic cell 141 from the elements when the electric vehicle 101 is parked and/or in use.

The photovoltaic cell 141 is an electric device. The photovoltaic cell 141 captures electromagnetic radiation from the sun. The photovoltaic cell 141 converts the captured electromagnetic radiation into electric energy. The photovoltaic cell 141 is positioned with on the electric vehicle 101 such that the sun is within the field of view of the photoelectric regeneration device 122. The photovoltaic cell 141 is the component of the photoelectric regeneration device 122 that captures electromagnetic radiation from the sun. The photovoltaic cell 141 is the component of the photoelectric regeneration device 122 that converts the captured electromagnetic radiation into electric energy. The photovoltaic cell 141 electrically connects to the motive battery 112. The electric energy that is generated by the photovoltaic cell 141 is transferred to the motive battery 112.

The cell isolation diode 142 is a diode. The cell isolation diode 142 inserts into the electrical connection between the photovoltaic cell 141 and the motive battery 112. The cell isolation diode 142 isolates the photovoltaic cell 141 from the motive battery 112. By isolate is meant that the cell isolation diode 142 prevents electric energy from flowing from the motive battery 112 into the photovoltaic cell 141.

The zener diode 123 is an electric circuit element. The zener diode 123 installs between the positive terminal of the motive battery 112 and the outputs of each regeneration device selected from the plurality of regeneration devices. The zener diode 123 acts as a voltage limiting device. The zener diode 123 prevents the plurality of regeneration devices 102 from generating over voltages that would harm the motive battery 112 during the recharging process.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Battery: As used in this disclosure, a battery is a chemical device consisting of one or more cells, in which chemical energy is converted into electricity and used as a source of power. Batteries are commonly defined with a positive terminal and a negative terminal.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Channel: As used in this disclosure, a channel is a negative space used to guide the motion of an object or through which an object or fluid passes.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electric Vehicle: As used in this disclosure, an electric vehicle is a vehicle that uses an electric motor for propulsion. EV is a common abbreviation for electric vehicle. A hybrid vehicle is a vehicle that is fitted with both a combustion engine and an electric motor. The term electric vehicle is often used as a generic term the extends to also include a hybrid vehicle.

Environment: As used in this disclosure, an environment refers to the physical conditions surrounding an object. The term environment is often limited to the physical conditions that the object interacts with.

Field of View: As used in this disclosure, a field of view refers to one or more angles which delimits an area within which a photoelectric device will detect a light source.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Circuit: As used in this disclosure, a fluidic circuit is a closed loop path through which a fluid flows. The closed loop will generally initiate and terminate at reservoir.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Gas: As used in this disclosure, a gas refers to a state (phase) of matter that is fluid and that fills the volume of the structure that contains it. Stated differently, the volume of a gas always equals the volume of its container.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that is coaxially mounted in the stator. The rotation of the rotor within the stator physically generates the electrical energy. A generator can generated an electrical voltage selected from the group consisting of an AC voltage and a DC voltage. When a DC voltage is generated, this disclosure assumes that the term generator includes commutator and electrical circuitry required to generate a regulated DC voltage.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Liquid: As used in this disclosure, a liquid refers to a state (phase) of matter that is fluid and that maintains, for a given pressure, a fixed volume that is independent of the volume of the container.

Manifold: As used in this disclosure, a manifold is a pipe or chamber having several ports through which one or more fluids are gathered or distributed.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Port: As used in this disclosure, a port is an aperture formed in an object that allows fluid to flow through the boundary of the object.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternative, a turbine can run in a reverse mode wherein externally provided rotational energy will be converted into kinetic energy that is expressed as the movement or compression of a fluid or gas.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Zener Diode: As used in this disclosure, a Zener diode is a two terminal electrical device that is used to generate a known voltage that is relatively independent of variations in the voltage applied to the Zener diode. The known voltage is referred to as the Zener voltage.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An electric vehicle comprising an electric vehicle and a plurality of regeneration devices;

wherein the plurality of regeneration devices mount on the electric vehicle;

wherein the electric vehicle comprises an electric motor and a motive battery;

wherein each regeneration device selected from the plurality of regeneration devices converts an environmentally available energy source into electric energy;

wherein the generated electric energy is used to recharge the motive battery;

wherein the environmentally available energy source is selected from the group consisting of: a) solar energy; and, b) wind energy;

wherein the electric motor is an electromechanical device;

wherein the electric motor converts electric energy into rotational energy;

wherein the electric motor provides the electric vehicle with the motive forces necessary to move the electric vehicle;

wherein the electric energy generated by the motive battery is transmitted to the electric motor;

wherein the motive battery electrically connects to each regeneration device selected from the plurality of regeneration devices;

wherein each selected regeneration device electrically connects to the motive battery such that each selected regeneration device reverses the polarity of the motive battery;

wherein the plurality of regeneration devices comprises a collection of regeneration devices;

wherein the energy generated by each selected regeneration device is used to recharge the motive battery;

wherein each regeneration device selected from the plurality of regeneration devices mounts on the electric vehicle;

wherein each selected regeneration device mounts on the electric vehicle such that the selected regeneration device has access to the environmentally available energy source;

wherein the plurality of regeneration devices comprises a turbine regeneration device, a photoelectric regeneration device, and a Zener diode;

wherein the turbine regeneration device is an electromechanical device;

wherein the turbine regeneration device captures atmospheric gases as the electric vehicle moves through the air;

wherein the turbine regeneration device captures the atmospheric gases under pressure such that the captured atmospheric gases move through the turbine regeneration device;

wherein the turbine regeneration device converts the momentum of the moving mass of the atmospheric gases into electric energy.

2. The electric vehicle according to claim 1, wherein the electric vehicle is an energy regeneration system;

wherein the electric vehicle is a motorized vehicle;

wherein the electric vehicle is an electrically powered vehicle.

3. The electric vehicle according to claim 2, wherein the motive battery is an electrochemical device;

wherein the motive battery stores chemical potential energy;

wherein the motive battery converts the chemical potential energy into electric energy.

4. The electric vehicle according to claim 3, wherein the motive battery electrically connects to the electric motor.

5. The electric vehicle according to claim 4, wherein each regeneration device selected from the plurality of regeneration devices is an electric device;

wherein each selected regeneration device electrically connects to the motive battery of the electric vehicle;

wherein each selected regeneration device converts an environmentally available energy source into electric energy.

6. The electric vehicle according to claim 5, wherein the turbine regeneration device electrically connects to the motive battery;

wherein the electric energy that is generated by the turbine regeneration device is transferred to the motive battery.

7. The electric vehicle according to claim 6, wherein the turbine regeneration device comprises a turbine, an electric generator, and a generator isolation diode;

wherein the turbine is a mechanical device;

wherein the turbine converts the flow of atmospheric gases through the turbine regeneration device into rotational energy;

wherein the turbine mechanically links to the electric generator;

wherein the turbine transfers the generated rotation energy to the electric generator through the mechanical linkage;

wherein the electric generator is an electromechanical device;

wherein the electric generator converts the rotational energy received from the turbine into electric energy;

wherein the electric generator electrically connects to the motive battery;

wherein the electric energy that is generated by the electric generator is transferred to the motive battery;

wherein the generator isolation diode is a diode;

wherein the generator isolation diode inserts into the electrical connection between the electric generator and the motive battery;

wherein the generator isolation diode isolates the electric generator from the motive battery;

wherein by isolate is meant that the generator isolation diode prevents electric energy from flowing from the motive battery into the electric generator.

8. The electric vehicle according to claim 7, wherein the turbine further comprises an air intake port structure, a flow manifold structure, and an air discharge port structure;

wherein the air intake port structure is a fluid port;

wherein the air intake port structure receives the atmospheric gases from the air;

wherein the air intake port structure comprises a collection of ports that collect air from: a) the front bumper of the electric vehicle; and, b) each of one or more wheel wells of the electric vehicle;

wherein the air intake port structure transports the captured atmospheric gases to the flow manifold structure;

wherein the flow manifold structure is a manifold;

wherein the flow manifold structure receives the atmospheric gas flow from each fluid port of the air intake port structure;

wherein the flow manifold structure merges the multiple received flows of atmospheric gases into a single flow of atmospheric gas;

wherein the flow manifold structure transports the merged atmospheric gases to the turbine for conversion into rotational energy;

wherein the air discharge port structure receives the flow of atmospheric gases that are discharged from the turbine;

wherein the air discharge port structure discharges the flow of atmospheric gases from the turbine regeneration device.

9. The electric vehicle according to claim 5, wherein the photoelectric regeneration device is a photoelectric device;

wherein the photoelectric regeneration device mounts on the superior exterior surfaces of the electric vehicle;

wherein the photoelectric regeneration device mounts on the electric vehicle such that the sun is within the field of view of the photoelectric regeneration device;

wherein the photoelectric regeneration device captures electromagnetic radiation from the sun;

wherein the photoelectric regeneration device converts the captured electromagnetic radiation into electric energy;

wherein the photoelectric regeneration device electrically connects to the motive battery;

wherein the electric energy that is generated by the photoelectric regeneration device is transferred to the motive battery.

10. The electric vehicle according to claim 9, wherein the photoelectric regeneration device comprises a photovoltaic cell and a cell isolation diode;

wherein the photovoltaic cell is an electric device;

wherein the photovoltaic cell captures electromagnetic radiation from the sun;

wherein the photovoltaic cell converts the captured electromagnetic radiation into electric energy;

wherein the photovoltaic cell is the component of the photoelectric regeneration device that mounts on the electric vehicle such that the sun is within the field of view of the photoelectric regeneration device;

wherein the photovoltaic cell is the component of the photoelectric regeneration device that captures electromagnetic radiation from the sun;

wherein the photovoltaic cell is the component of the photoelectric regeneration device that converts the captured electromagnetic radiation into electric energy;

wherein the photovoltaic cell electrically connects to the motive battery;

wherein the electric energy that is generated by the photovoltaic cell is transferred to the motive battery;

wherein the cell isolation diode is a diode;

wherein the cell isolation diode inserts into the electrical connection between the photovoltaic cell and the motive battery;

wherein the cell isolation diode isolates the photovoltaic cell from the motive battery;

wherein by isolate is meant that the cell isolation diode prevents electric energy from flowing from the motive battery into the photovoltaic cell.

11. The electric vehicle according to claim 10, wherein the photovoltaic cell is positioned beneath a superior surface of the electric vehicle;

wherein the protective cover is provided and placed over the photovoltaic cell;

wherein the protective cover is flush with the superior surface of the electric vehicle;

wherein the protective cover protects the photovoltaic cell.

12. The electric vehicle according to claim 5, wherein the Zener diode is an electric circuit element;

wherein the Zener diode installs between the positive terminal of the motive battery and the outputs of each regeneration device selected from the plurality of regeneration devices;

wherein the Zener diode acts as a voltage limiting device;

wherein the Zener diode prevents the plurality of regeneration devices from generating over voltages that would harm the motive battery during the recharging process.

* * * * *